INVENTOR
EDWARD F. APPLEBY, JR.
FRANK P. HODGES

BY Claude Funkhouser

ATTORNEY

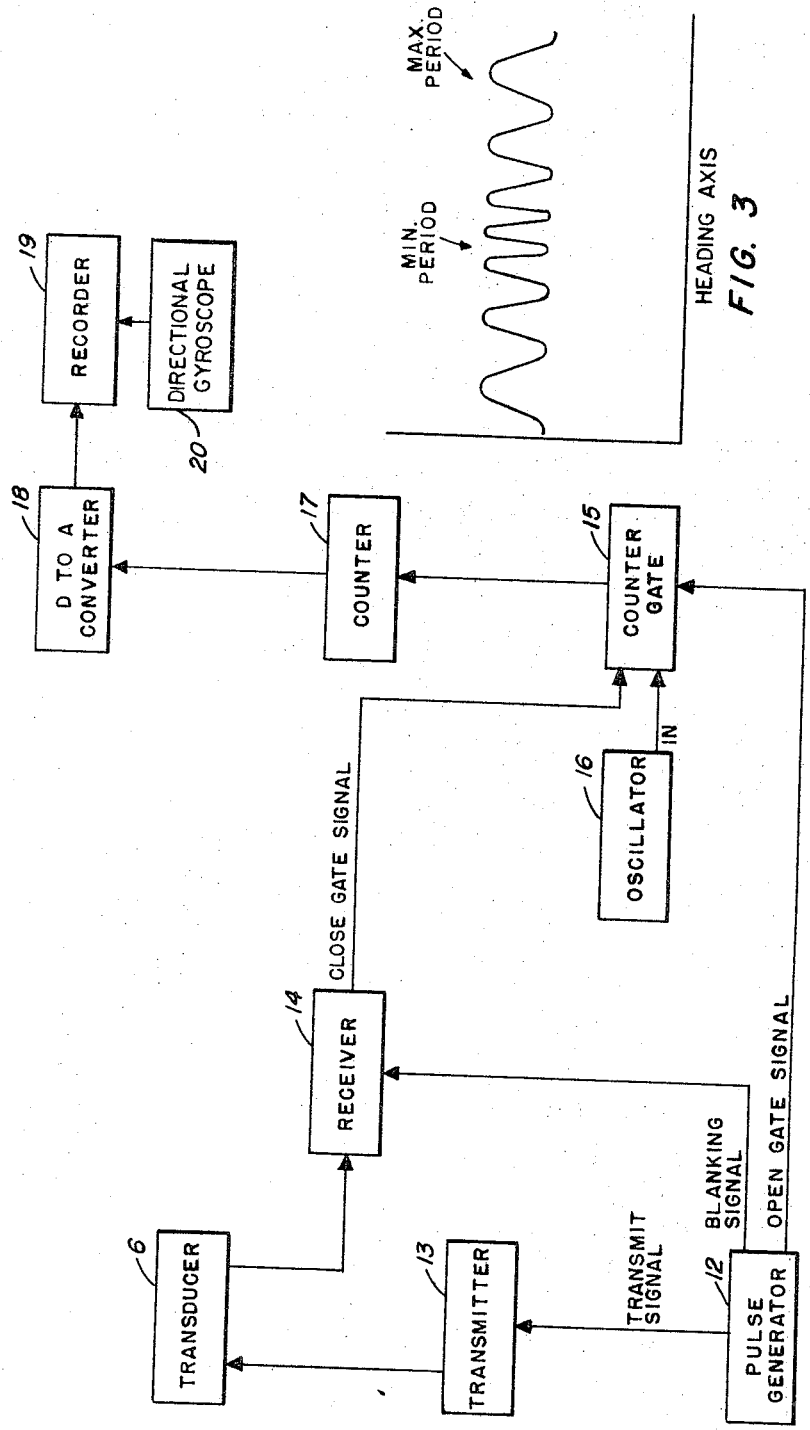

United States Patent Office

3,336,800
Patented Aug. 22, 1967

3,336,800
SYSTEM FOR MEASURING SEA SURFACE CHARACTERISTICS FROM A SUBMERGED SUBMARINE
Edward F. Appleby, Jr., and Frank P. Hodges, Baltimore, Md., assignors, by mesne assignments, to the United States of America as represented by the Secretary of the Navy
Filed Feb. 15, 1965, Ser. No. 432,908
1 Claim. (Cl. 73—170)

ABSTRACT OF THE DISCLOSURE

A method for measuring the wave height and direction from a submerged submarine by maneuvering the submarine through a 360° circular turn while continuously echo-ranging upward to the sea surface to obtain distance measurements from the submarine to the sea surface and continuously recording the measurements on a strip to provide an indication of the direction of the waves by noting the heading at which the wave period is a maximum or a minimum and an indication of the height of the waves by noting the vertical deflection of the recorded curve.

---

Figure 1:
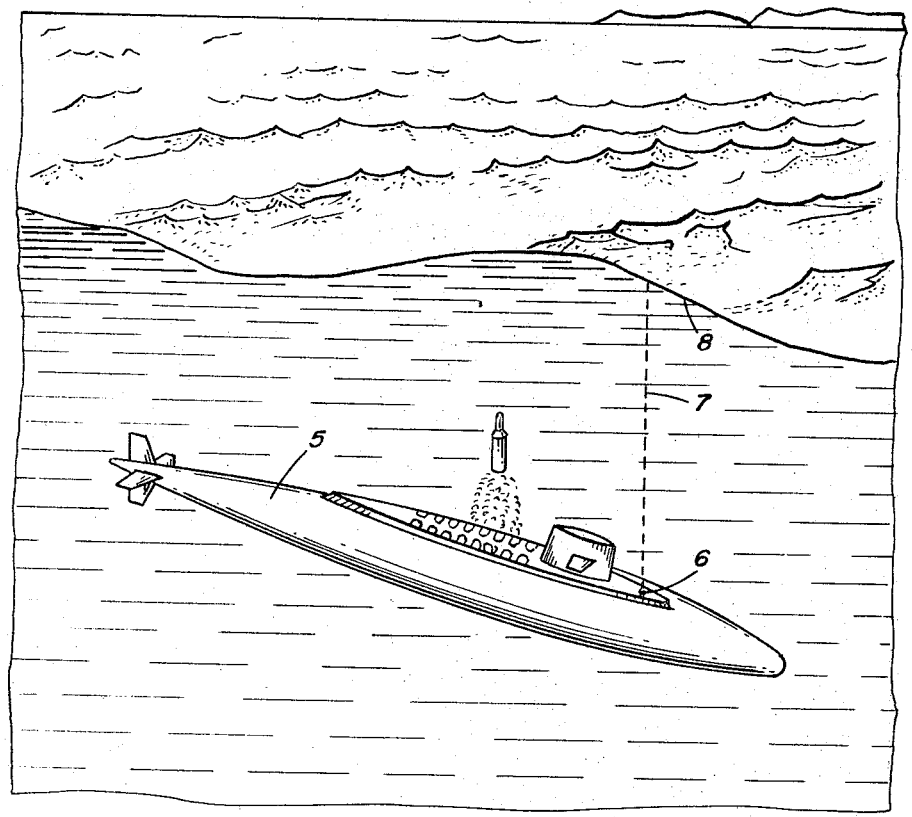

This invention relates generally to a method for indicating oceanographic conditions and more particularly to a method for measuring sea surface characteristics from a submerged submarine.

It is often essential that submerged submarines and more particularly submarines which launch guided missiles while submerged be able to make rapid determinations of certain sea surface characteristics such as sea state, wave height and wave direction while the submarine is submerged.

The prior art systems have utilized a plurality of surface scanning transducers mounted on the upper part of the submarine; these alternately projecting and receiving signals from the submarine to the surface of the sea to measure wave height. The transducers are located along the length of the submarine and they operate together so that a measure of the relative height of the waves above the entire length of the submarine is obtained. A circuitry within the system controls the order of measurement and converts the data into signals that can be displayed on an indicator. The problems resulting from the use of this system are first that the operator is left with the problem of determining by his own observation of the display the characteristics of the sea, and from the presentation must decide whether it has the characteristics of a fore-aft sea or beam-sea and must determine the wave height by an observation of the average wave profile, and second, that the equipment is complicated. The plurality of external transducers and associated cable connectors and hull penetrations are continuous sources of trouble. The equipment within the submarine contains relays and commutators which often present reliability problems.

This invention provides a system which is much less complex than present systems in use, with the method of obtaining information about the surface of the sea being more simple and requiring fewer decisions by the operator. This improved system eliminates many of the components used in prior systems and modifies many others. It reduces the number of necessary transducers to one. It eliminates the switching circuitry and relays necessary to control alternate operation of the plurality of transducers. It provides an indicator in the form of a Brush type or strip recorder thus eliminating the necessity for the operator to make quick decisions while watching a visual light display panel.

It is an object of the present invention to provide a method for measuring and determining sea surface characteristics from a submerged submarine.

Other objects, advantages and novel features of the invention will become apparent from the following detailed description of the invention when considered in conjunction with the accompanying drawings wherein:

FIG. 1 is a view of the submarine incorporating the invention;

FIG. is a block diagram of the electronic components of the invention; and

FIG. 3 is an exemplary showing of the strip recording of the invention.

As illustrated generally in FIG. 1, the present invention provides a means for ascertaining the sea surface characteristics from a submerged submarine 5. Mounted somewhere on the upper hull area of the submarine 5 is a single highly directional transducer 6 which emits a narrow, highly directional wave front 7 upward toward the surface of the sea 8. According to established and understood principles, this wave front 7 will be reflected back by the sea surface and will be received by the transducer 6. The distance from the submarine to that portion of the sea surface which has reflected wave front 7 back can then be calculated by methods which are old and well-known.

The electronic equipment which is used to measure distances under water by reflected waves is also old and well-known, and a preferred system is illustrated in FIG. 2. The aforementioned transducer 6 does the physical sending and receiving of the pulse and its echo. The pulse originates in a pulse generator 12 and is coupled by means of transmitter 13 and propagated through the water by transducer 6. The return echo received by the transducer is passed to a receiver 14, this receiver also being subjected to the usual blanking signal from pulse generator 12 so that receiver 14 is not hit by the outgoing pulse. Pulse generator 12 also sends an open gate signal to counter gate 15. In addition to the open gate signal, counter gate 15 receives a close gate signal from receiver 14 and utilizes an oscillator 16 for timing the interval between the open gate signal and the close gate signal and thus the time between the sending and receiving of the pulsed wave 7. The counter 17 does the actual calculation of the time involved. Once counter 17 has determined the time interval between the sending and receiving of pulsed wave 7, this signal is fed to a digital to analog converter 18 and then to the strip recorder 19. The output of a standard direction gyroscope 20 is also fed to recorder 19 to indicate the heading of the submarine for any wave height reading. The above-described electronic system is standard among echo ranging equipment and is old and well-known.

In order to utilize this electronic system to provide the desired results, it is necessary first to have the transducer alternately send and receive pulses in order to get a wave profile at an optimum rate, and then to maneuver the submarine through a 360° circular turn. If the submarine has a vertical displacement during the maneuver it may not be clear whether a change in the height of the curve produced by the recorder is due to the vertical displacement of the submarine or due to non-uniform wave amplitudes. In order to avoid this possible ambiguity, it is best to keep the submarine in a horizontal plane, although this condition is not completely necessary for obtaining meaningful results. In this way, a 360° surface profile will be printed out as a linear analog on the strip recorder for analyzation. The following discussion explains the analyzation and use of the recorded signal.

As shown in FIG. 3, the curve produced as the strip recording will show the wave height profile produced along the ordinate and the measured wave period produced as well as the submarine direction along the abscissa. The measured wave period will not be the same as the actual wave period because of the effect of the speed of the submarine but will still be proportional thereto. When the submarine is headed directly into the sea, in the course of the 360° turn, the produced wave peaks will be shown closer together on the graph, a minimum measured wave period. The operator need only look at the strip recording and note the heading of the submarine at the moment of the minimum measured wave period and that heading is the direction from which the sea is running. The converse is also true, i.e., the direction of maximum measured wave period will be the direction to which the sea is running.

Sea state is determined from the strip recording by observing the peak-to-peak excursion of the graph. This is an actual showing of the trough-to-peak height of the waves, which is indicative of the surface sea state. The peak-to-peak excursions of the strip recording are not affected by ship's heading.

A measure of the average ship's depth can be obtained from the echo ranging equipment in the normal manner by averaging the maximum and minimum range obtained while making the strip recording.

It is thus readily seen that the invention herein described provides a much more simple and much quicker method for determining sea surface characteristics from a submerged submarine.

Obviously many modifications and variations of the present invention are possible in the light of the above teachings. It is therefore to be understood that within the scope of the appended claim the invention may be practiced otherwise than as specifically described.

What is claimed is:

A method for measuring the wave height and direction from a submerged submarine comprising:

maneuvering the submarine through a 360° circular turn;

continuously echo-ranging upward to the sea surface while maintaining the circular pattern to continuously find the distance from the submarine to the sea surface;

continuously recording the results of the echo-ranging on a strip recording so that a surface wave profile is presented;

whereby an indication is provided from which the direction of the waves may be determined by noting the heading at which the wave period is a maximum or a minimum and by means of which the wave height may be determined by noting a vertical indicative deflection of the recorded curve.

References Cited
UNITED STATES PATENTS

| | | | |
|---|---|---|---|
| 2,567,229 | 9/1951 | Morse | 340—3 |
| 3,098,389 | 7/1963 | Melchoir | 73—170 |
| 3,263,206 | 7/1966 | Brown et al. | 340—3 |

JAMES J. GILL, *Acting Primary Examiner.*

R. C. QUEISSER, *Examiner.*

C. A. RUEHL, J. J. SMITH, *Assistant Examiners.*